US012151583B2

(12) United States Patent
Chen et al.

(10) Patent No.: US 12,151,583 B2
(45) Date of Patent: *Nov. 26, 2024

(54) CHARGING MANAGEMENT METHODS AND SYSTEMS FOR ELECTRIC VEHICLE CHARGING STATIONS

(71) Applicant: Noodoe Group Inc., Wilmington, DE (US)

(72) Inventors: Wen-Nan Chen, Taipei (TW); En-Yu Shih, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/503,533

(22) Filed: Oct. 18, 2021

(65) Prior Publication Data

US 2022/0242270 A1    Aug. 4, 2022

(30) Foreign Application Priority Data

Jan. 29, 2021   (TW) ................................ 110103562

(51) Int. Cl.
*B60L 53/68* (2019.01)
*B60L 53/67* (2019.01)
*H02J 7/00* (2006.01)

(52) U.S. Cl.
CPC .............. *B60L 53/68* (2019.02); *B60L 53/67* (2019.02); *H02J 7/00032* (2020.01); *H02J 7/00712* (2020.01)

(58) Field of Classification Search
CPC ...................................................... B60L 53/68
USPC ........................................................ 320/109
See application file for complete search history.

(56) References Cited

U.S. PATENT DOCUMENTS

| 2022/0274500 | A1* | 9/2022 | Wang | H02J 3/322 |
| 2022/0340038 | A1* | 10/2022 | Hou | B60L 53/62 |
| 2022/0410756 | A1* | 12/2022 | Hou | B60L 53/64 |
| 2022/0410758 | A1* | 12/2022 | Hou | G01C 21/3476 |
| 2023/0211696 | A1* | 7/2023 | Wang | B60L 53/68 |
| | | | | 320/109 |
| 2023/0302949 | A1* | 9/2023 | Liou | G06Q 30/04 |

* cited by examiner

*Primary Examiner* — Yalkew Fantu
(74) *Attorney, Agent, or Firm* — McClure, Qualey & Rodack, LLP

(57) ABSTRACT

Charging management methods and systems for electric vehicle charging stations for use in a charging field with charging stations are provided. First charging operation with first power parameter is first performed for at least one first electric vehicle by at least one first charging station, wherein the first power parameter is a first output value. A server receives a charging request from second charging station or a mobile device through a network, and communicates with first charging station and second charging station to perform a load adjustment operation. Load adjustment operation is to adjust the first power parameter from the first output value to a lower power limit value of first charging station, and instruct second charging station to perform a second charging operation with a second power parameter for second electric vehicle, wherein the second power parameter is an upper power limit value of second charging station.

13 Claims, 8 Drawing Sheets

CHARGING MANAGEMENT METHODS AND SYSTEMS FOR ELECTRIC VEHICLE CHARGING STATIONS

BACKGROUND OF THE INVENTION

Field of the Invention

The disclosure relates generally to charging management methods and systems for electric vehicle charging stations, and, more particularly to charging management methods and systems that can dynamically allocate power output based on the charging demand in a charging field.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Most of the power facility in the field has already been constructed. It is expensive to update the power facility, such as the capacity of the electric panel, and the construction time is very time-consuming. Generally, the number of electric vehicle charging stations that can be installed in a single charging field is limited by the existing maximum load capacity of the existing field. Therefore, in the case of limited electric vehicle charging stations, the driver of an electric vehicle may have to wait time because the charging station is in use, or need to find other nearby charging stations for charging operations, which causes inconvenience in use, and reduces the willingness to adopt electric vehicles.

Therefore, under the premise of not updating the power facility, some charging sites can implement load adjustment operation to increase the number of electric vehicle charging stations that can be installed in the field. In the load adjustment operation, more electric vehicles can be charged in this charging field at the same time by reducing the power output of respective electric vehicle charging stations. However, due to the communication limitations between the electric vehicle charging station and the electric vehicle, field power trips often occur during load adjustment operations when the incoming vehicles request to perform charging operations, resulting in the suspension or interruption of the electric vehicles in the charging operations.

BRIEF SUMMARY OF THE INVENTION

In a charging management method for electric vehicle charging stations for use in a charging field with charging stations are provided. First, a first charging operation with a first power parameter is performed for at least one first electric vehicle by at least one first charging station, wherein the first power parameter is a first output value. A server receives a charging request from a second charging station or a mobile device through a network, and communicates with the at least one first charging station and the second charging station to perform a load adjustment operation. During the load adjustment operation, the server communicates with the at least one first charging station to adjust the first power parameter from the first output value to a lower power limit value of the first charging stations. In response to the charging request, the server transmits a signal to the second charging station to instruct the second charging station to perform a second charging operation with a second power parameter for a second electric vehicle, wherein the second power parameter is an upper power limit value of the second charging station.

An embodiment of a charging management system for electric vehicle charging stations for use in a charging field with charging stations comprises at least one first charging station, a second charging station, and a server. The at least one first charging station performs a first charging operation with a first power parameter for at least one first electric vehicle, wherein the first power parameter is a first output value. The server receives a charging request from the second charging station or a mobile device through a network, and communicates with the at least one first charging station and the second charging station to perform a load adjustment operation. During the load adjustment operation, the server communicates with the at least one first charging station to adjust the first power parameter from the first output value to a lower power limit value of the first charging stations. In response to the charging request, the server transmits a signal to the second charging station to instruct the second charging station to perform a second charging operation with a second power parameter for a second electric vehicle, wherein the second power parameter is an upper power limit value of the second charging station.

In some embodiments, the server further calculates a target power parameter value according to a power limit of the charging field and an amount of the at least one first charging station and the second charging station, communicates with the at least one first charging station to adjust the first power parameter of the at least one first charging station from the lower power limit value to the target power parameter value, and communicates with the second charging station to adjust the second power parameter of the second charging station from the upper power limit value to the target power parameter value.

In some embodiments, the server further calculates a remaining power corresponding to the charging field according to a power limit of the charging field and the first power parameter output by the at least one first charging station in use among the electric vehicle charging stations, determines whether the remaining power is greater than the upper power limit value of the second charging station, and performs the load adjustment operation when the remaining power is not greater than the upper power limit value of the second charging station.

In some embodiments, when the remaining power is greater than the upper power limit value of the second charging station, the server does not perform the load adjustment operation, and directly transmits a signal to the second charging station via a network to instruct the second charging station to perform the second charging operation with the second power parameter for the second electric vehicle, wherein the second power parameter is the upper power limit value of the second charging station.

In some embodiments, when the at least one first charging station does not adjust the first power parameter from the first output value to the lower power limit value of the first charging station, the server marks the first charging operation corresponding to the at least one first charging station, and excludes the marked first charging station from the load adjustment operation.

In some embodiments, the server further sends a confirmation request to a specific mobile device corresponding to the at least one first electric vehicle via the network, receives a confirmation signal corresponding to the confirmation request from the specific mobile device via the network, and performs the load adjustment operation in response to the confirmation signal.

Charging management methods for electric vehicle charging stations may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
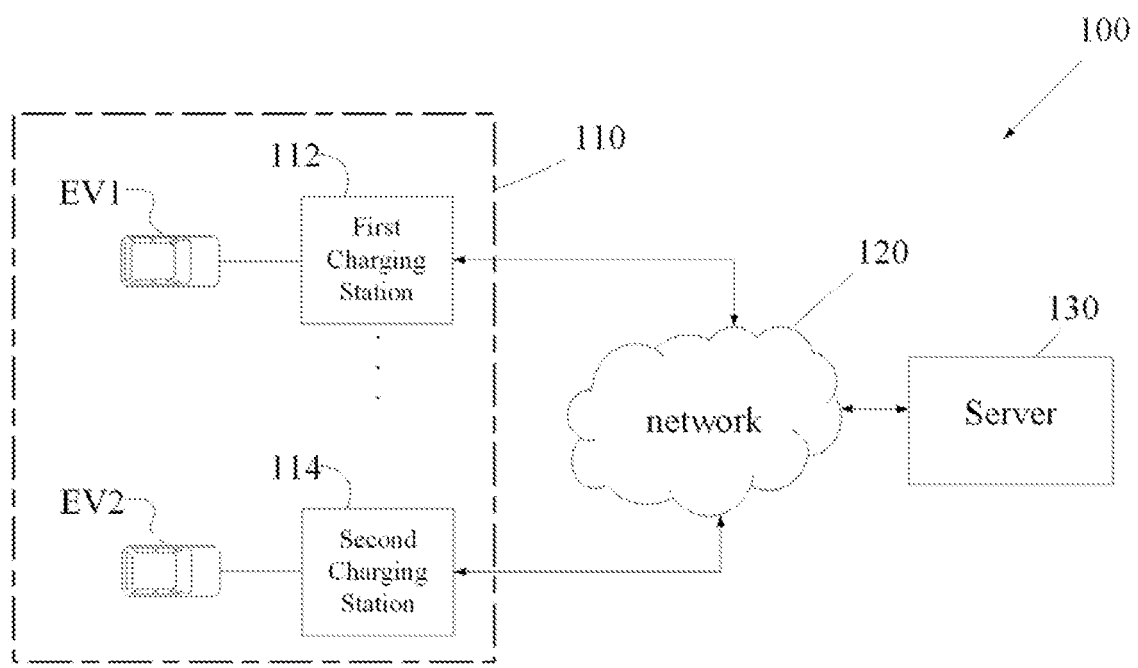
FIG. 1 is a schematic diagram illustrating an embodiment of a charging management system for electric vehicle charging stations of the invention.

FIG. 1 is a schematic diagram illustrating an embodiment of a charging management system for electric vehicle charging stations of the invention. The charging management system for electric vehicle charging stations 100 can be used in a charging filed 110 with a plurality of electric vehicle charging stations. It is noted that, the charging filed 110 has a power limitation. As shown in FIG. 1, the charging management system for electric vehicle charging stations 100 comprises at least one first charging station 112, a second charging station 114, and a server 130 respectively connected with the first charging station 112 and the second charging station 114 via a network 120. The respective charging stations can provide electric vehicles (EV1, EV2) for charging operations. In some embodiments, the network 120 may be a wired network, a telecommunication network, and a wireless network, such as a Wi-Fi network. The server 130 can receive various data from the first charging station 112 and the second charging station 114 via the network 120, and transmit related signals to the first charging station 112 and the second charging station 114. The first charging station 112 and the second charging station 114 can perform related operations according to the signals received from the server 130. For example, when the electric vehicle EV1 is coupled to the first charging station 112 through a charging gun of the first charging station 112 for a charging operation, the first charging station 112 can continuously transmit charging information corresponding the charging operation of the electric vehicle EV1 via the network 120, and the server 130 can receive the charging information of the corresponding charging operation from the first charging station 112 via the network 120. Similarly, when the electric vehicle EV2 is coupled to the second charging station 114 through a charging gun of the second charging station 114 to perform a charging operation, the second charging station 114 can continuously transmit the charging information corresponding the charging operation of the electric vehicle EV2 via the network 120, and the server 130 can receive the charging information of the corresponding charging operation from the second charging station 114 via the network 120.

It is noted that the user can connect the electric vehicle EV1 and the first charging station 112 to each other, such as inserting a charging gun into the charging port of the electric vehicle to send a charging request corresponding to the first charging station 112 to use the first charging station 112. The first charging station 112 performs a charging operation for the electric vehicle EV1. Similarly, the user can connect the electric vehicle EV2 and the second charging station 114 to each other, such as inserting a charging gun into the charging port of the electric vehicle to send a charging request corresponding to the second charging station 114 to use the second charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the first charging station 112 via the network 120, so that the first charging station 112 outputs power to the electric vehicle EV1, such as an electric scooter or an electric car, which is electrically connected to it, or prohibits the first charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the first charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load adjustment operation for the electric vehicle charging stations in the charging field 110. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle. The details of the load adjustment operation will be described later.

Figure 2:
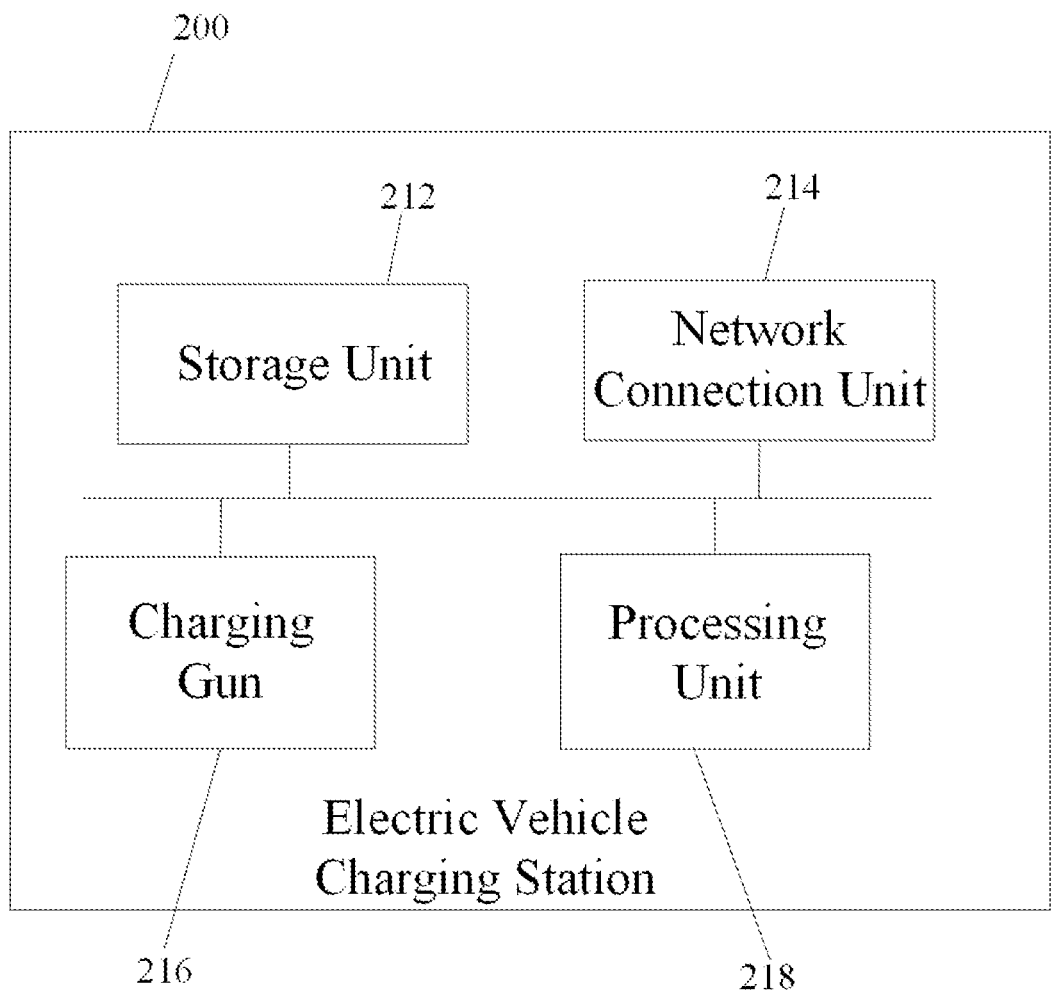
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the first charging station 112 and the second charging station 114, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data, such as related information of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the charging management method of the electric vehicle charging stations of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 216 may use the network connection unit 214 to transmit the power state of the corresponding electric vehicle through a network for a cloud management server, such as the cloud server 130, for subsequent charging management. In another embodiment, the processing unit 216 can obtain the power parameter of a charging operation from the server 130, determine the output power according to the power parameter received from the server 130, and output the power to at least one electric vehicle through the charging gun 216 to perform the charging operation.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
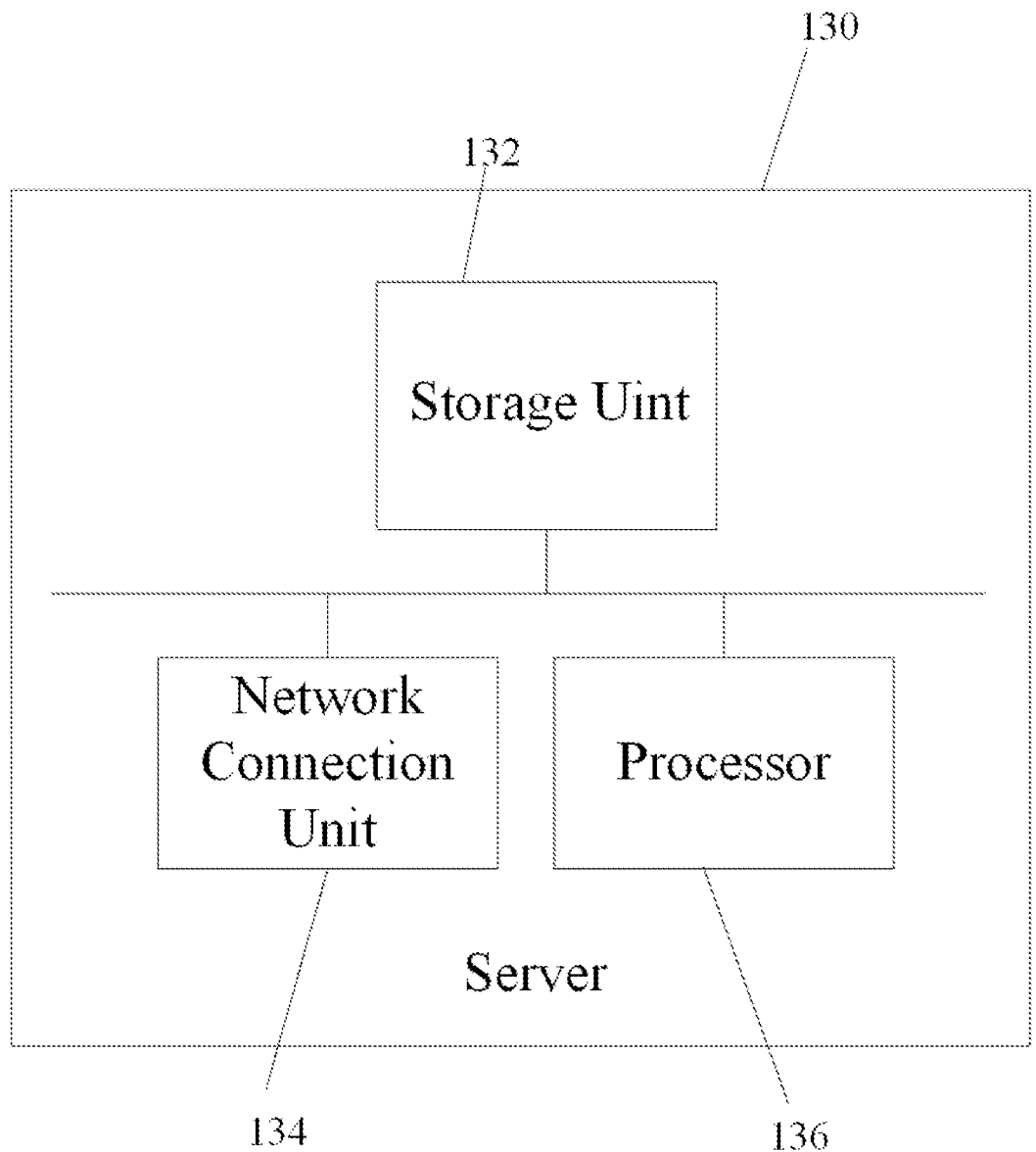
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device or a specific electric vehicle charging station, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. The server 130 can connect to and communicate with the electric vehicle charging stations 112 and 114 via the network 120, such as a wired network, a telecommunication network, and a wireless network, such as a Wi-Fi network by using the network connection unit 134, thus to transmit related data/signals/commands to the respective electric vehicle charging stations through the network 120 to control whether the electric vehicle charging station outputs power at a specify output power efficiency to charge an electric vehicle. The processor 136 can control the related operations of software and hardware in the server 130, and perform the charging management methods for electric vehicle charging stations of the invention, which will be discussed later. It is understood that, in some embodiments, the processor 136 may be a general-purpose controller, a Micro-Control Unit, MCU, or a Digital Signal Processor, DSP, etc., to provide data analysis, processing, and calculation functions.

Figure 4:
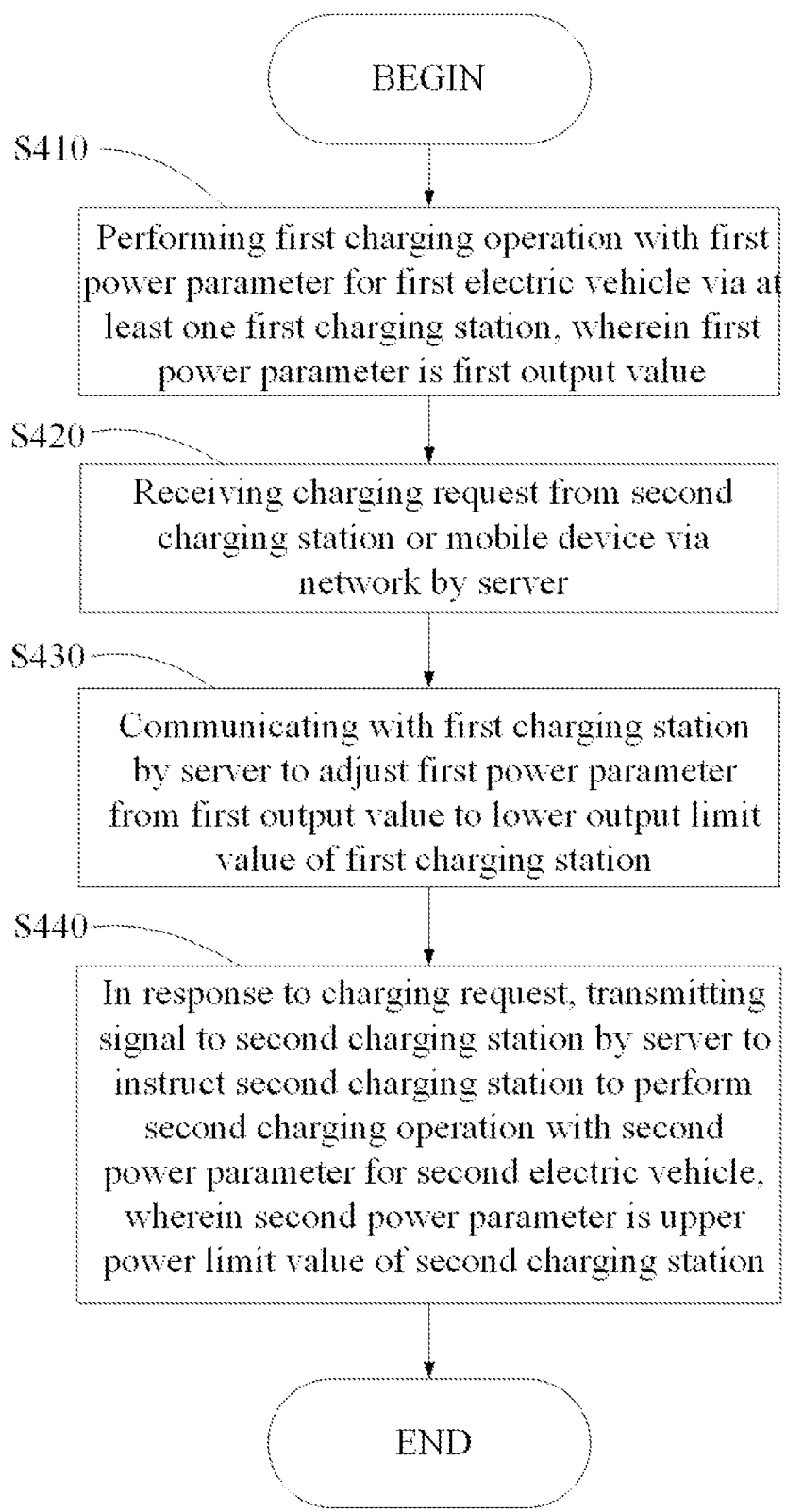
FIG. 4 is a flowchart of an embodiment of a charging management method for electric vehicle charging stations of the invention.

FIG. 4 is a flowchart of an embodiment of a charging management method for electric vehicle charging stations of the invention. The charging management method for electric vehicle charging stations of the invention is applicable to a charging field with a plurality of electric vehicle charging stations, and the charging field has a power limit. The respective electric vehicle charging station in the charging field can be electrically coupled with a remote server via a network.

In step S410, at least one first charging station in the charging field uses a first power parameter to perform a first charging operation for at least one first electric vehicle. The first power parameter is a first output value. It is noted that, in some embodiments, the first power parameter may be an ampere value. The electric vehicle charging station can output power to the electric vehicle for a charging operation according to the value of the power parameter, such as an ampere value. In step S420, the server receives a charging request from a second charging station in the charging field or a mobile device via a network. As mentioned above, in some embodiments, the user can connect the electric vehicle and the charging station to each other, such as inserting a charging gun into the charging interface of the electric vehicle, thus to send a charging request corresponding to the charging station to the server. In some embodiments, the user can use his/her mobile phone to scan a QR code on the charging station through the scanning function of an application to generate the above-mentioned charging request, thereby starting a charging process. In some embodiments, the user can select a specific charging station through the application and execute an activation function to generate the above-mentioned charging request, thereby starting a charging process.

Then, the server communicates with the at least one first charging station and the second charging station via the network to perform a load adjustment operation. In the load adjustment operation, in step S430, the first power parameter of the at least one first charging station is adjusted from the first output value to the lower power limit value of the first charging station. It is reminded that the respective first charging station have its own upper power limit value and lower power limit value. Specifically, the first charging station can use the upper power limit value as the power parameter at the highest to output power to the electric vehicle during a charging operation. On the other hand, the first charging station at least needs to use the lower power limit value as the power parameter to output power to the electric vehicle during a charging operation. Then, in step S440, the server instructs the second charging station to perform a second charging operation using a second power parameter for a second electric vehicle through the network, wherein the second power parameter is the upper power limit value of the second charging station. Similarly, the second charging station has an upper power limit value and a lower power limit value. Specifically, the second charging station can use the upper power limit value as the power parameter at the highest to output power to the electric vehicle during a charging operation. On the other hand, the second charging station at least needs to use the lower power limit value as the power parameter to output power to the electric vehicle during a charging operation.

Figure 5:
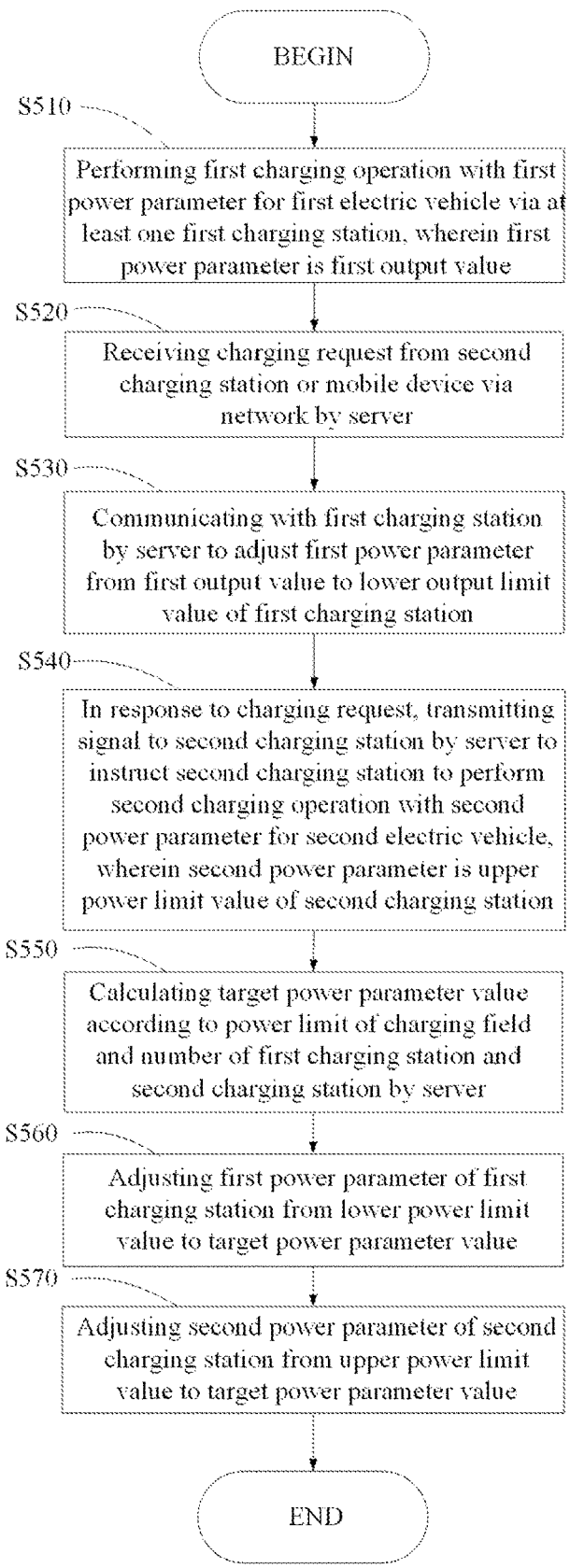
FIG. 5 is a flowchart of another embodiment of a charging management method for electric vehicle charging stations of the invention.

FIG. 5 is a flowchart of another embodiment of a charging management method for electric vehicle charging stations of the invention. The charging management method for electric vehicle charging stations of the invention is applicable to a charging field with a plurality of electric vehicle charging stations, and the charging field has a power limit. The respective electric vehicle charging station in the charging field can be electrically coupled with a remote server via a network.

In step S510, at least one first charging station in the charging field uses a first power parameter to perform a first charging operation for at least one first electric vehicle. The first power parameter is a first output value. It is noted that, in some embodiments, the first power parameter may be an ampere value. The electric vehicle charging station can output power to the electric vehicle for a charging operation according to the value of the power parameter, such as an ampere value. In step S520, the server receives a charging request from a second charging station in the charging field or a mobile device via a network. As mentioned above, in some embodiments, the user can connect the electric vehicle and the charging station to each other, such as inserting a charging gun into the charging interface of the electric vehicle, thus to send a charging request corresponding to the charging station to the server. In some embodiments, the user can use his/her mobile phone to scan a QR code on the charging station through the scanning function of an application to generate the above-mentioned charging request, thereby starting a charging process. In some embodiments, the user can select a specific charging station through the application and execute an activation function to generate the above-mentioned charging request, thereby starting a charging process.

Then, the server communicates with the at least one first charging station and the second charging station via the network to perform a load adjustment operation. In the load adjustment operation, in step S530, the first power parameter of the at least one first charging station is adjusted from the first output value to the lower power limit value of the first charging station. It is reminded that the respective first charging station have its own upper power limit value and lower power limit value. Specifically, the first charging station can use the upper power limit value as the power parameter at the highest to output power to the electric vehicle during a charging operation. On the other hand, the first charging station at least needs to use the lower power limit value as the power parameter to output power to the electric vehicle during a charging operation. Then, in step S540, the server instructs the second charging station to perform a second charging operation using a second power parameter for a second electric vehicle through the network, wherein the second power parameter is the upper power limit value of the second charging station. Similarly, the second charging station has an upper power limit value and a lower power limit value. Specifically, the second charging station can use the upper power limit value as the power parameter at the highest to output power to the electric vehicle during a charging operation. On the other hand, the second charging station at least needs to use the lower power limit value as the power parameter to output power to the electric vehicle during a charging operation.

Then, in step S550, the server calculates a target power parameter value according to the power limit of the charging field and the number of the at least one first charging station and the second charging station. It is noted that, in some embodiments, the target power parameter value may be equal to quotient of the power limit of the charging field divided by the number of the at least one first charging station and the second charging station. It must be noted that, the calculation of the aforementioned target power parameter value is only an example of this case, and the invention is not limited thereto. The total value of the target power parameter value multiplied by the number of the at least one first charging station and the second charging station must be less than the power limit of the charging field. Then, in step S560, the server communicates with the at least one first charging station via the network to adjust the first power parameter of the first charging station from the lower power limit value to the target power parameter value, and in step S570, communicates with the second charging station via the network to adjust the second power parameter of the second charging station from the upper power limit value to the target power parameter value.

Figure 6:
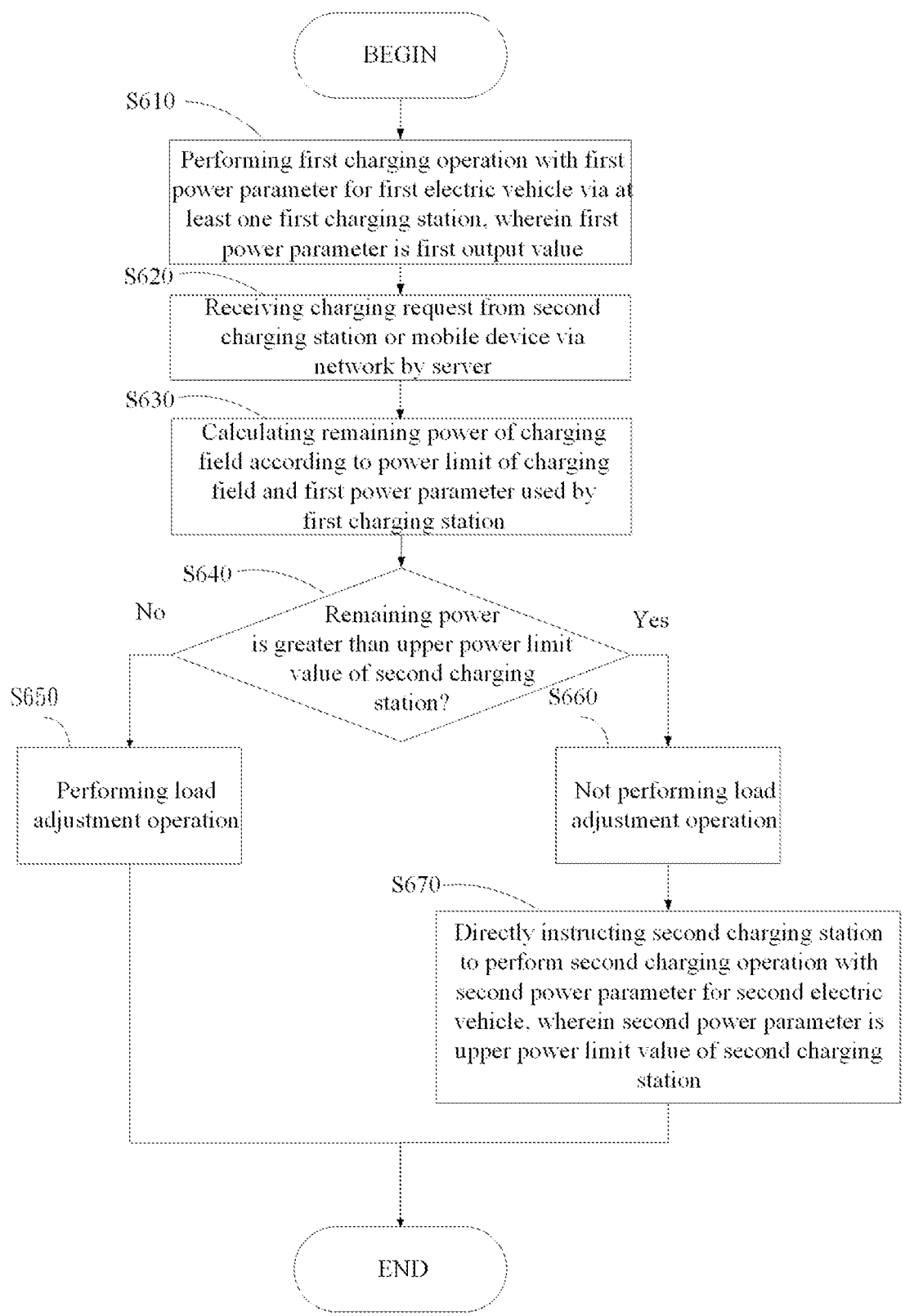
FIG. 6 is a flowchart of another embodiment of a charging management method for electric vehicle charging stations of the invention.

FIG. 6 is a flowchart of another embodiment of a charging management method for electric vehicle charging stations of the invention. The charging management method for electric vehicle charging stations of the invention is applicable to a charging field with a plurality of electric vehicle charging stations, and the charging field has a power limit. The respective electric vehicle charging station in the charging field can be electrically coupled with a remote server via a network. In this embodiment, the server can determine whether to perform a load adjustment based on the current state of the charging field.

In step S610, at least one first charging station in the charging field uses a first power parameter to perform a first charging operation for at least one first electric vehicle. The first power parameter is a first output value. It is noted that, in some embodiments, the first power parameter may be an ampere value. The electric vehicle charging station can output power to the electric vehicle for a charging operation according to the value of the power parameter, such as an ampere value. In step S620, the server receives a charging request from a second charging station in the charging field or a mobile device via a network. As mentioned above, in some embodiments, the user can connect the electric vehicle and the charging station to each other, such as inserting a charging gun into the charging interface of the electric vehicle, thus to send a charging request corresponding to the charging station to the server. In some embodiments, the user can use his/her mobile phone to scan a QR code on the charging station through the scanning function of an application to generate the above-mentioned charging request, thereby starting a charging process. In some embodiments, the user can select a specific charging station through the application and execute an activation function to generate the above-mentioned charging request, thereby starting a charging process. Then, in step S630, the server calculates the remaining power of the charging field according to the power limit of the charging field and the first power parameter used by the at least one first charging station in the electric vehicle charging stations, and step S640, it is determined whether the remaining power in the charging field is greater than the upper power limit value of the second charging station. As mentioned above, the second charging station has an upper power limit value and a lower power limit value. Specifically, the second charging station can use the upper power limit value as the power parameter at the highest to output power to the electric vehicle during a charging operation. On the other hand, the second charging station at least needs to use the lower power limit value as the power parameter to output power to the electric vehicle during a charging operation. When the remaining power is not greater than the upper power limit value of the second charging station (No in step S640), in step S650, the load adjustment operation is performed. The load adjustment operation can be as steps S430 and S440 in FIG. 4, or steps S530 to S570 in FIG. 5, which are omitted here. When the remaining power is greater than the upper power limit value of the second charging station (Yes in step S640), in step S660, the load adjustment operation is not performed, and in step S670, in response to the charging request, the server directly transmits a signal through the network to the second charging station, so that the second charging station uses the second power parameter to perform a second charging operation for the second electric vehicle, wherein the second power parameter is the upper power limit value of the second charging station.

It is noted that, since the electric vehicles manufactured by various car manufacturers do not necessarily meet the charging standard specifications, there may also be situations in which certain electric vehicles do not reduce the power output according to the instructions of the server during the load adjustment operation. In this case, additional management of load adjustment operations can be carried out for this situation.

Figure 7:
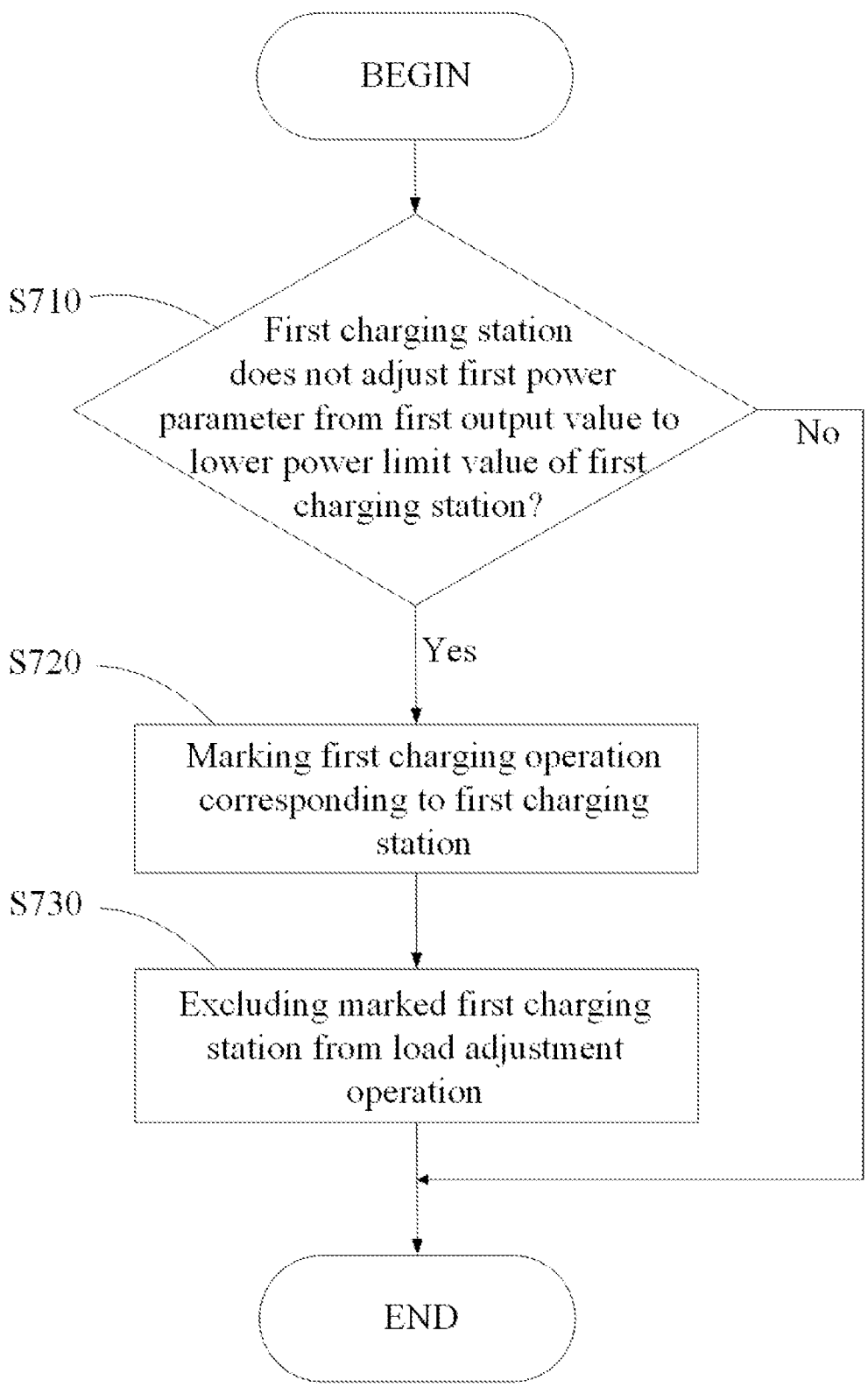
FIG. 7 is a flowchart of an embodiment of a management method for electric vehicle charging stations with load adjustment operation of the invention.

FIG. 7 is a flowchart of an embodiment of a management method for electric vehicle charging stations with load adjustment operation of the invention. When the server sends an instruction/signal to the at least one first charging station to request the at least one first charging station to adjust its first power parameter, in step S710, data is received from the at least one first charging station via the network, and it is determined whether the first charging station has adjusted its first power parameter from the first output value to the lower power limit value of the first charging station. When the first charging station has adjusted the first power parameter from the first output value to the lower power limit value of the first charging station (No in step S710), the procedure ends. In other words, the server continues the communication and adjustment operation for the second charging station in the load adjustment operation. When the first charging station has not adjusted the first power parameter from the first output value to the lower power limit value of the first charging station (Yes in step S710), in step S720, the first charging operation corresponding to the first charging station is marked, and in step S730, the marked first charging station is excluded from the load adjustment operation. Please note that when the first charging operation of the corresponding first charging station ends, the mark of the first charging station/first charging operation can be removed.

Figure 8:
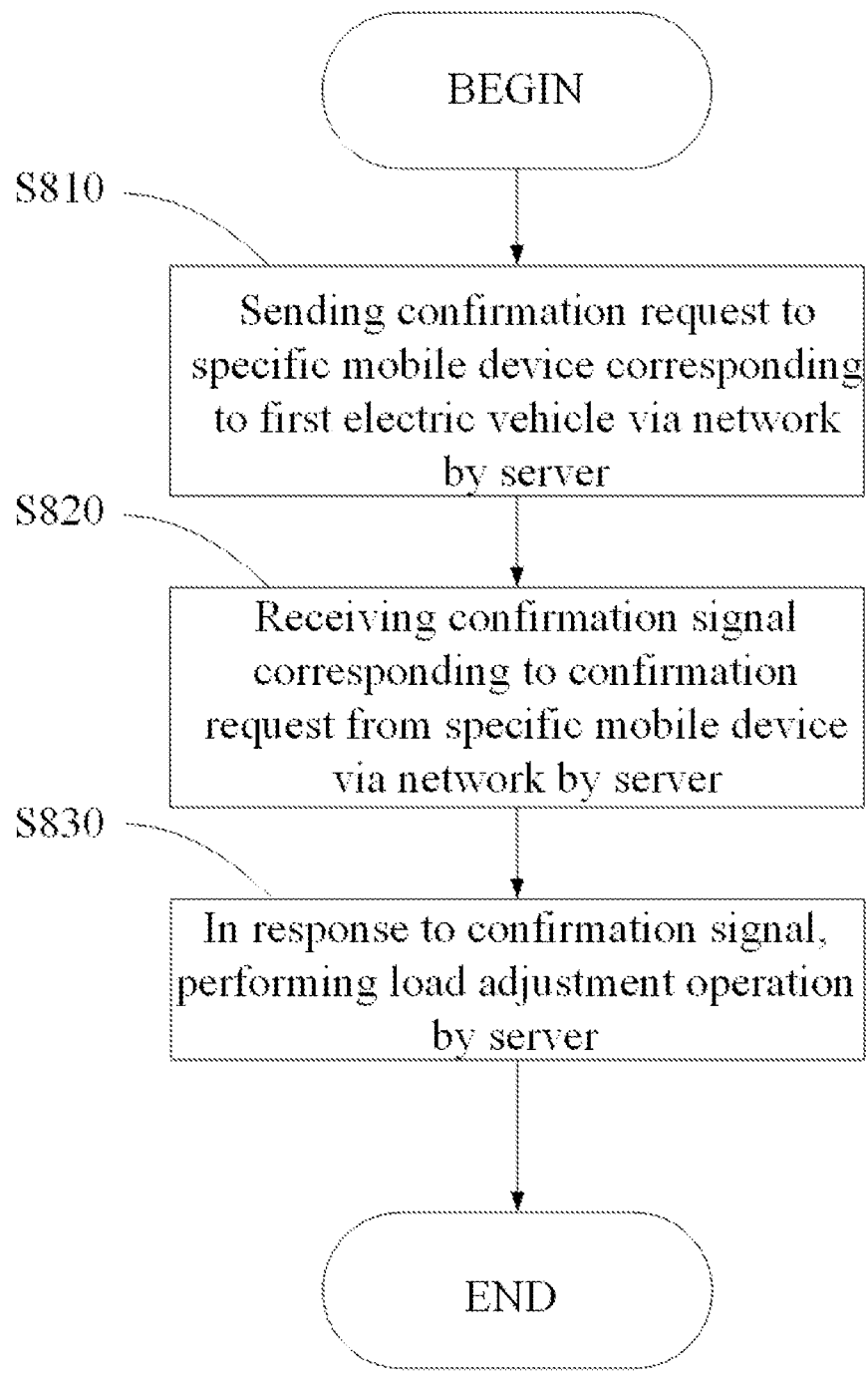
FIG. 8 is a flowchart of another embodiment of a charging management method for electric vehicle charging stations of the invention.

FIG. 8 is a flowchart of another embodiment of a charging management method for electric vehicle charging stations of the invention. In this embodiment, the server may first ask the consent of the electric vehicle owner currently charging at the first charging station before performing the load adjustment operation.

First, in step S810, the server sends a confirmation request to a specific mobile device corresponding to the first electric vehicle via the network. It should be noted that, in some embodiments, the confirmation request may be used to notify the first electric vehicle that the charging operation will perform a load adjustment operation, and require the user to agree and confirm. In step S820, the server receives a confirmation signal corresponding to the confirmation request from the specific mobile device via the network. In some embodiments, the confirmation request received by the specific mobile device may include a confirmation button. When the confirmation button is pressed, the specific mobile device can send the confirmation signal to the server. It is reminded that the confirmation request received by the specific mobile device can also include a reject button. When the rejection button is pressed, the specific mobile device can send a rejection signal to the server. In other words, the specific mobile device refuses to perform the load adjustment operation. In response to the confirmation signal, in step S830, the server performs the load adjustment operation. It is understood that, when there are multiple first charging stations charging at the same time, if some users who currently using the first charging stations agree to the load adjustment operation (transmit confirmation signals), and some users who currently using the first charging stations do not agree to the load adjustment operation (transmitting a rejection signal), the server can exclude the first charging station that does not agree to the load adjustment operation, and include the first charging station that agrees to the load adjustment operation into the load adjustment operation.

Therefore, the charging management methods and systems for electric vehicle charging stations of the invention can dynamically allocate output power according to the charging request in the charging field, so as to perform a load adjustment operation according to the upper power limit value and the lower power limit value of the electric vehicle charging station, thereby avoiding field power jumps that may be caused when later vehicles enter the load adjustment operation in the charging field.

Charging management methods for electric vehicle charging stations, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A charging management method for electric vehicle charging stations for use in a charging field with a plurality of electric vehicle charging stations, in which the respective electric vehicle charging station is connected to a server via a network, comprising:
    performing a first charging operation with a first power parameter for at least one first electric vehicle via at least one first charging station, wherein the first power parameter is a first output value;
    receiving a charging request from a second charging station or a mobile device via the network by the server; and
    communicating with the at least one first charging station and the second charging station to perform a load adjustment operation by the server, wherein the load adjustment operation comprises the steps of:
        communicating with the at least one first charging station by the server to adjust the first power parameter from the first output value to a lower power limit value of the first charging station; and
        in response to the charging request, transmitting a signal to the second charging station by the server to instruct the second charging station to perform a second charging operation with a second power parameter for a second electric vehicle, wherein the second power parameter is an upper power limit value of the second charging station.

2. The method of claim 1, further comprising:
    calculating a target power parameter value according to a power limit of the charging field and a number of the at least one first charging station and the second charging station by the server;
    communicating with the at least one first charging station by the server to adjust the first power parameter of the at least one first charging station from the lower power limit value to the target power parameter value; and
    communicating with the second charging station by the server to adjust the second power parameter of the second charging station from the upper power limit value to the target power parameter value.

3. The method of claim 1, further comprising:
    calculating a remaining power corresponding to the charging field according to a power limit of the charging field and the first power parameter used by the at least one first charging station in use among the electric vehicle charging stations;
    determining whether the remaining power is greater than the upper power limit value of the second charging station; and
    performing the load adjustment operation when the remaining power is not greater than the upper power limit value of the second charging station.

4. The method of claim 3, further comprising when the remaining power is greater than the upper power limit value of the second charging station, stop performing the load adjustment operation, and directly transmitting a signal to the second charging station via a network by the server to instruct the second charging station to perform the second charging operation with the second power parameter for the second electric vehicle, wherein the second power parameter is the upper power limit value of the second charging station.

5. The method of claim 1, further comprising:
    when the at least one first charging station does not adjust the first power parameter from the first output value to the lower power limit value of the first charging station, marking the first charging operation corresponding to the at least one first charging station; and
    excluding the marked first charging station from the load adjustment operation.

6. The method of claim 1, further comprising:
    sending a confirmation request to a specific mobile device corresponding to the at least one first electric vehicle via the network by the server;
    receiving a confirmation signal corresponding to the confirmation request from the specific mobile device via the network by the server; and
    in response to the confirmation signal, performing the load adjustment operation by the server.

7. A charging management system for electric vehicle charging stations for use in a charging field with a plurality of electric vehicle charging stations, comprising:
    at least one first charging station performing a first charging operation with a first power parameter for at least one first electric vehicle, wherein the first power parameter is a first output value;
    a second charging station; and
    a server connecting to the respective electric vehicle charging stations via a network, receiving a charging request from the second charging station or a mobile device via the network, and communicating with the at least one first charging station and the second charging station to perform a load adjustment operation, wherein the load adjustment operation comprises communicating with the at least one first charging station by the server to adjust the first power parameter from the first output value to a lower power limit value of the first charging stations, and in response to the charging request, transmitting a signal to the second charging station by the server to instruct the second charging station to perform a second charging operation with a second power parameter for a second electric vehicle, wherein the second power parameter is an upper power limit value of the second charging station.

8. The system of claim 7, wherein the server further calculates a target power parameter value according to a power limit of the charging field and an amount of the at least one first charging station and the second charging station, communicates with the at least one first charging station to adjust the first power parameter of the at least one first charging station from the lower power limit value to the target power parameter value, and communicates with the second charging station to adjust the second power parameter of the second charging station from the upper power limit value to the target power parameter value.

9. The system of claim 7, wherein the server further calculates a remaining power corresponding to the charging field according to a power limit of the charging field and the first power parameter used by the at least one first charging station in use among the electric vehicle charging stations, determines whether the remaining power is greater than the upper power limit value of the second charging station, and performs the load adjustment operation when the remaining power is not greater than the upper power limit value of the second charging station.

10. The system of claim 9, wherein when the remaining power is greater than the upper power limit value of the second charging station, the server does not perform the load adjustment operation, and directly transmits a signal to the second charging station via a network to instruct the second charging station to perform the second charging operation with the second power parameter for the second electric vehicle, wherein the second power parameter is the upper power limit value of the second charging station.

11. The system of claim 7, wherein when the at least one first charging station does not adjust the first power parameter from the first output value to the lower power limit value of the first charging station, the server marks the first charging operation corresponding to the at least one first charging station, and excludes the marked first charging station from the load adjustment operation.

12. The system of claim 7, wherein the server further sends a confirmation request to a specific mobile device corresponding to the at least one first electric vehicle via the network, receives a confirmation signal corresponding to the confirmation request from the specific mobile device via the network, and performs the load adjustment operation in response to the confirmation signal.

13. A machine-readable storage medium comprising a computer program, which, when executed, causes a device to perform a charging management method for electric vehicle charging stations for use in a charging field with a plurality of electric vehicle charging stations, in which the respective electric vehicle charging station is connected to a server via a network, wherein the method comprises:

performing a first charging operation with a first power parameter for at least one first electric vehicle via at least one first charging station, wherein the first power parameter is a first output value;

receiving a charging request from a second charging station or a mobile device via the network; and communicating with the at least one first charging station and the second charging station to perform a load adjustment operation, wherein the load adjustment operation comprises the steps of:

communicating with the at least one first charging station to adjust the first power parameter from the first output value to a lower power limit value of the first charging station; and in response to the charging request, transmitting a signal to the second charging station to instruct the second charging station to perform a second charging operation with a second power parameter for a second electric vehicle, wherein the second power parameter is an upper power limit value of the second charging station.

* * * * *